R. A. RICHARDSON.
AGRICULTURAL IMPLEMENT.
APPLICATION FILED JUNE 29, 1915.
1,171,651.
Patented Feb. 15, 1916.
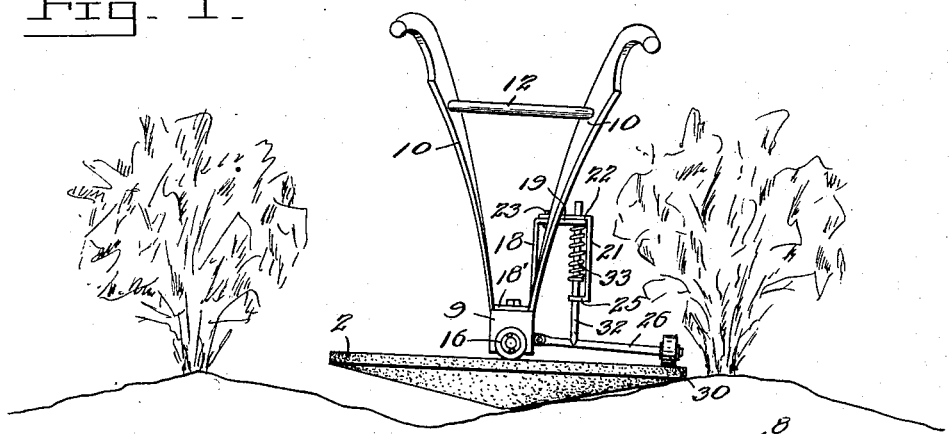
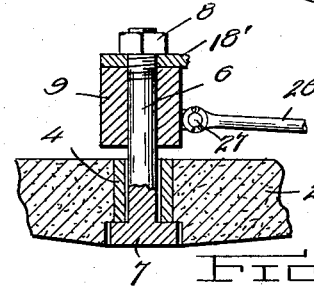
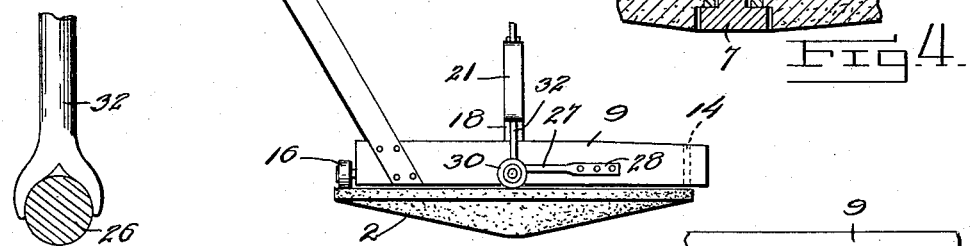
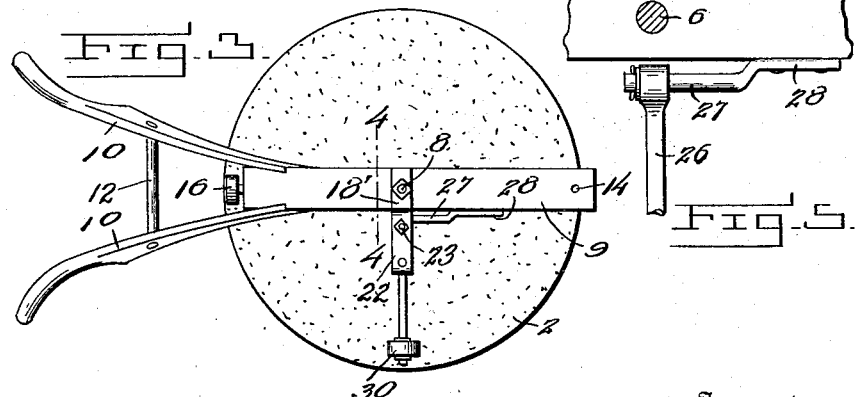
Witness
Inventor
Robert A. Richardson,
By
C. A. Mason, Attorney

UNITED STATES PATENT OFFICE.

ROBERT A. RICHARDSON, OF MADISON, GEORGIA.

AGRICULTURAL IMPLEMENT.

1,171,651. Specification of Letters Patent. Patented Feb. 15, 1916.

Application filed June 29, 1915. Serial No. 37,110.

*To all whom it may concern:*

Be it known that I, ROBERT A. RICHARDSON, a citizen of the United States, residing at Madison, in the county of Morgan and State of Georgia, have invented certain new and useful Improvements in Agricultural Implements, of which the following is a specification.

This invention relates to agricultural implements, and more particularly to a device for cultivating the soil in the neighborhood of the roots of growing plants.

An object of the invention is to provide an agricultural implement which is constructed and arranged to be drawn over the ground between adjacent rows of plants and to exert a heavy pressure upon the soil so as to break the crust which forms after a rain.

It is well known that following a shower a more or less hard crust forms upon the surface of the soil which is not only objectionable because it is partly impervious to moisture and prevents water from reaching the roots of the plants, but it also prevents the air from reaching the roots, and this is detrimental to the growth of the plants. It is the usual practice to use a plow, or harrow, to stir up or mellow the soil adjacent to the plants, and this is done frequently from the time that the plant begins to grow, until it reaches full maturity, the object being to obtain free access to the roots by breaking up and loosening the soil. One objection to this common practice is that the roots of the plant are frequently disturbed by the plow, harrow, or other cultivating tool, and in many instances these roots are injured, or severed from the plant, which is detrimental to the plant's growth. Under the present invention the soil is not plowed, harrowed, or otherwise dug up, but is subjected to action which crushes the crust, and permits the free access of air and moisture to the roots of the plants.

In its preferred form my invention comprises a disk of concrete, metal, or other suitable material, which is preferably suspended pivotally from a plow beam, or other suitable support, to which may be attached handles and also suitable means for connection with a draft device at its forward end. The disk is made of considerable weight, as about 100 to 200 pounds, and its lower surface preferably tapers from the center toward the periphery, thereby presenting a convex, or conical-shaped bottom portion. This disk when pulled over the ground by a team of horses, or other means, is caused to rotate and very effectually breaks up the crust of the soil, and also leaves the soil smooth so as to make it receptive for the next rain, and such condition is brought about without disturbing the lateral roots of the plants in any manner.

Further objects and advantages of the invention will be made apparent from the following description when considered in connection with the accompanying drawings, in which:

Figure 1 shows, in rear elevation, an implement embodying the principles of the present invention, the implement being illustrated in the position which it would occupy when in use between two adjacent rows of plants. Fig. 2 shows the device in side elevation; Fig. 3 is a plan view; Fig. 4 is a detail, sectional view, on the line 4—4, Fig. 3; Fig. 5 is a detail view of the hinge connection for the presser-roll carrying arm; and Fig. 6 is another detail view.

The implement comprises a disk 2, which may be made of concrete, cast iron, or any other suitable material having sufficient weight and strength to accomplish the desired result. This disk is substantially flat on top, and its bottom portion may be either of conical form, as shown, or it may be convexed or rounded, if preferred. In practice it is proposed to make this disk about 30 inches in diameter, and of a weight which will be between 100 and 200 pounds, though, of course, the particular dimensions and weight suggested may be varied, if desired.

The disk 2 is provided with a central bore in which is preferably located a thimble 4, which constitutes a bearing for a pivot bolt 6 having a head 7 which is seated in a central recess in the bottom portion of the disk, and a shank which passes through a hole in the beam 9, the extreme end of the shank being threaded to receive a nut 8, which secures the bolt 6 to the beam. The disk 2 is thus suspended from the beam by the bolt in a manner to permit free rotation of the disk upon the bolt 6 as an axial center.

To the rear end of the beam 9 are preferably attached ordinary plow handles 10, which are connected by a suitable brace 12, and the forward end of the beam 9 is shown as having a perforation 14 to provide for a bolt, clevis, or any other suitable device for connection with a team, for draft purposes. An anti-friction roller 16 is journaled upon a stud which projects rigidly from the rear end of the beam 9, and this roller bears upon the top of the disk 2 and prevents contact between the beam and disk and reduces friction between the parts when the disk is rotating as it is being pulled over the ground.

A standard 18, having an angularly-bent foot 18', is provided with a hole to fit over the bolt 6, and is clamped by the nut 8 on said bolt to the top of the beam. This standard has a vertical portion, and also an angularly bent portion 19 which extends laterally from the beam 9 and is provided near its outer end with a perforation. An arm 21 is provided with an angularly bent portion 22 which overlaps the angular extension 19, and is suitably connected to the latter by a bolt 23, provided with a clamping nut. The angular portion 22 of the arm 21 has a perforation which registers with the perforation in the part 19, and the arm 21 is also provided with an angularly bent foot portion 25, the latter having a perforation which alines with the perforations in the parts 19 and 22.

An arm 26 has at its inner end an eye which fits over and has rotating bearing upon a stud 27, which is angularly bent from a plate 28 secured by screws, or other suitable devices, to one side of the beam 9, as best shown in Fig. 5. A washer and cotter pin serve to secure the arm 26 to the stud 27, the described position permitting free hinging movement of the arm on the stud. The outer end of the arm 26 carries an anti-friction roller 30 which rests upon the top of the disk 2 near its outer edge. A rod 32 is guided in the perforations in the parts 19, 22, and 25, and the lower end of this rod is forked as shown in Fig. 6, said fork embracing the arm 26, and a spiral spring 33 surrounds the rod 32, and is confined between a pin, or other abutment on the rod, and the lower surface of the angular portion 19.

The above described parts constitute a means for exerting, through the handles 10, beam 9, rod 32 and spring 33, a yielding pressure upon the roller 30, which pressure is transmitted by the parts described to the top of the disk 2 near one edge, and preferably on the right hand side of the operator as he holds the handles 10 and walks behind the cultivator. When, by means of a team or other draft means, the implement is pulled over the ground between two rows of plants, as shown in Fig. 1, the operator will exert sufficient pressure upon the roller 30 to cause that side of the disk 2 upon which said roller bears to press firmly against the ground, and the disk at the same time will be rotated about the pivot bolt 6 as a center. The result of the pressure on the ground as thus applied will be to break the crust, to smooth down all inequalities and break all lumps and thus prepare the ground for the next rain, besides putting the soil in such condition that the air may readily reach the roots of the plants. After passing down along the side of one row to the end thereof, the operator will turn the implement around, and the same will be pulled over the ground in an opposite direction from that first described, and along the side of the adjacent row of plants, shown to the left of Fig. 1 of the drawings, and the soil will be treated in the same manner as it was for the first row of plants. The frictional engagement between the ground and the disk 2 will, when pressure is applied to the outer edge of the disk through the roller 30, cause the disk to rotate freely, and this action not only tends to keep the lower surface of the disk clear of soil, but more effectually breaks the crust of the ground and smoothes the same so as to prepare it for the next rain.

Changes may be made in the details of the construction described, or in the proportions of the several parts without departing from the spirit of my invention.

Having thus described my invention what I claim as new and desire to secure by Letters Patent of the United States is:

1. An implement of the class described, comprising a support, and a disk having a continuous surface and adapted to roll over the ground and break the crust, said disk being of greater thickness at its center than at its periphery connected with the support by a central pivot and arranged to be rotated by engagement with the ground.

2. An implement of the class described, comprising a support arranged for connection with draft means, a disk having a conical smoothing surface for engagement with the ground, said disk connected centrally with said support by a vertical pivot and constructed to engage the ground at one side of its center and to be rotated while it is pulled over the ground.

3. An implement of the class described, comprising a beam, a disk having a bottom portion of conical form, with a continuous surface to engage the ground, a pivot connecting said disk and beam and arranged to permit rotation of said disk as it is pulled along while in engagement with the ground on one side of its center, and means to apply a yielding pressure to said disk on that side which engages the ground.

4. An implement of the class described, comprising a draft beam, handles connected therewith, a disk having its bottom portion of greater thickness at the center than at the periphery and having a substantially continuous surface for engagement with the ground and adapted to roll over the ground and break the crust, a substantially vertical pivot connecting said disk centrally with the beam, and means between said beam and disk to apply a yielding pressure to the disk on that side of its center which engages the ground.

5. An implement of the class described, comprising a draft beam, handles connected therewith, a disk having its bottom portion of conical form and having an unbroken smoothing surface to engage the ground, said disk being connected to said beam by a central pivot, an anti-friction roll carried by said beam and bearing upon the upper face of the disk, and yielding means to transmit pressure to the edge of the disk located at one side of said beam.

6. An implement of the class described, comprising a draft beam, handles connected therewith, a disk having its bottom portion of conical form and having an unbroken smoothing surface to engage the ground, said disk connected to said beam by a central pivot, an anti-friction roll between the rear end of said beam and the top of said disk, an arm hinged to the side of the beam and carrying at its end a roll bearing upon the disk, and yielding connections between said beam and arm.

7. An implement of the class described, comprising a draft beam, handles connected therewith, a disk having its bottom portion of conical form, and provided with a central perforation, a pivot bolt passing through said perforation and connected with said beam, an arm clamped to the beam and having an angular portion provided with a perforation, a bracket connected with said arm, and having a perforation therein, a spring pressed rod guided in said perforations, an arm hinged to the side of the beam and having at its outer end a roller bearing upon the disk near its edge, said spring pressed rod engaging said arm, and tending to hold said roller in engagement with the disk.

8. An implement of the class described, comprising a draft beam, handles connected therewith, a disk having its bottom of conical form and provided with a central perforation, a bolt passing through said perforation and through a perforation in said beam, an anti-friction roll between the rear end of said beam and the top of said disk, an arm hinged to the side of said beam, and carrying at its outer end a roller which bears upon the edge portion of the disk, a bracket clamped to the beam, a spring pressed rod guided in a perforation in said bracket and having its lower end provided with a fork which engages said arm, whereby the operator may, through the beam and said spring pressed rod, apply a yielding pressure to the disk near its outer edge and thereby hold said disk in engagement with the ground.

ROBERT A. RICHARDSON.

Witnesses:
A. H. WINTER,
E. L. WALKER.

Copies of this patent may be obtained for five cents each, by addressing the "Commissioner of Patents, Washington, D. C."